J. B. ALLEN & W. BOWLER.
WHEEL PULLER FOR MOTOR VEHICLES.
APPLICATION FILED APR. 18, 1911.
1,011,140.
Patented Dec. 12, 1911.
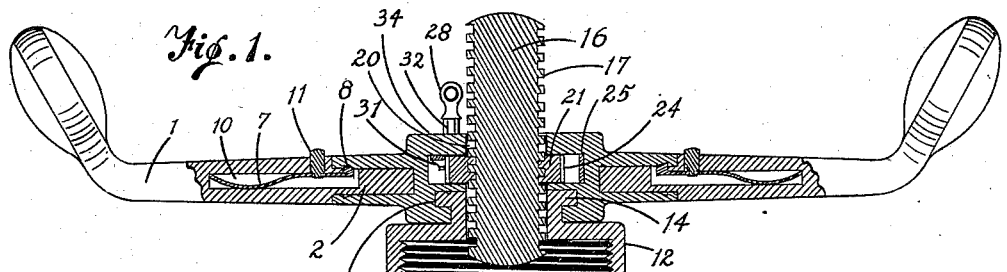
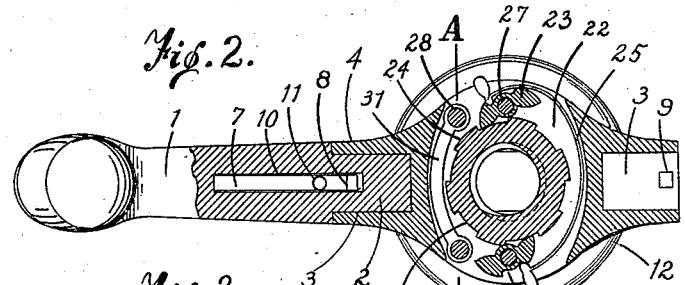
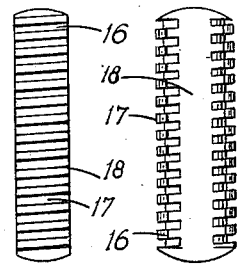
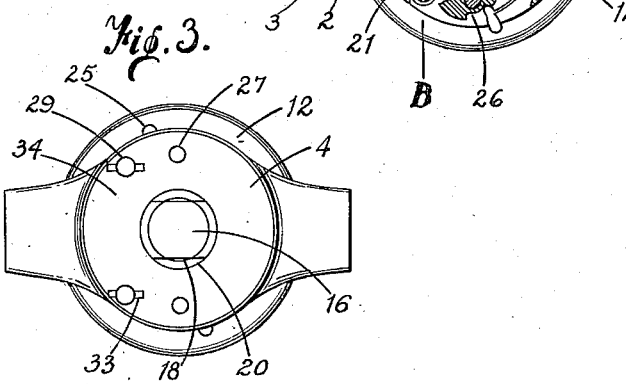
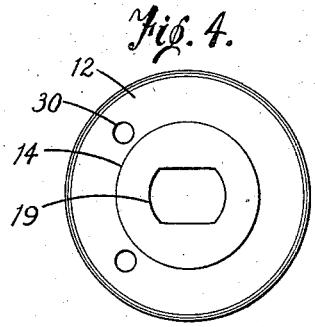
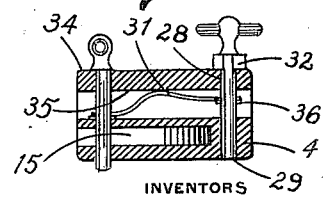
WITNESSES
INVENTORS
James B. Allen
William Bowler

UNITED STATES PATENT OFFICE.

JAMES B. ALLEN AND WILLIAM BOWLER, OF SAN DIEGO, CALIFORNIA.

WHEEL-PULLER FOR MOTOR-VEHICLES.

1,011,140.      Specification of Letters Patent.      Patented Dec. 12, 1911.

Application filed April 18, 1911. Serial No. 621,843.

*To all whom it may concern:*

Be it known that we, JAMES B. ALLEN and WILLIAM BOWLER, citizens of the United States, residing at San Diego, in the county of San Diego and State of California, have invented a new and useful Wheel-Puller for Motor-Vehicles, of which the following is a specification.

This invention relates to a motor vehicle wheel puller having for its object the provision of improved means of the several features herein specified, whereby the removal of the wheel from the axle is expeditiously effected. Heretofore in such removal, the wheel is frequently pried in a manner causing it to stick, making its removal an arduous task. To obviate this, we provide a puller, comprising a threaded sleeve to engage with the wheel hub, with a sliding bolt to push against the axle, an oscillating member with detachable handles revolubly mounted on said sleeve, and a ratchet nut therein to actuate the sliding bolt, our invention comprising the combination and arrangement of parts, substantially as herein specified, and of which a convenient embodiment is shown in the accompanying drawings in which like parts are denoted by similar reference characters.

While the elements shown and described are well adapted for the purposes for which they are intended, it is to be understood that no limitation is necessarily made to the precise structural details exhibited, but that changes, alterations, and modifications, which are within the spirit and scope of the claim, may be made if desired.

Of the drawings, Figure 1 is a sectional side view of the device with attached handles, Fig. 2, a sectional plan view, Fig. 3, a top plan view of the oscillating member with handles detached, Fig. 4, a detail view of threaded sleeve, Figs. 5 and 6, detail views of the sliding bolt, and Fig. 7, a sectional view on line A—B of Fig. 2 showing the locking pins.

Referring more particularly to the drawings in which like parts are designated by like numerals, in the several views, handles 1 have shanks 2 adaptable to sockets 3, in member 4, and are provided with spring catches 7, having notched ends 8, engaging with recesses 9, the catches being held in slots 10, by buttons 11, which are depressed in detaching the handles. Recesses 9, are provided in the opposite walls of sockets 3, thus adapting the handles to be attached to member 4 in a reversed position if desired. Sleeve 12 is screwed to the wheel hub, having threads 13, similar to the dust cap of the wheel. Retaining flange 14 engages with groove 15 in member 4 which is thereby revolubly operable upon said sleeve. Bolt 16, having threads 17 and flat sides 18, passes through opening 19, and also through circular opening 20, the bolt engaging with and being actuated by ratchet nut 21, mounted within opening 22, which extends transversely of member 4. Reversible ratchet-pawls 23, are held by spring 25 engaging with notches 26, in an operable position with teeth 24, on nut 21, the pawls being pivoted to pins 27, and adapted to rotate nut 21, when member 4, is operated. Member 4 is operable independently of or in unison with sleeve 12, in accordance with the position of locking-pins 28, which are slidably arranged in openings 29, and adapted to extend into openings 30 being normally held in engagement therewith, by spring 31, and having ears 32 engaging with slots 33. The locking pins are withdrawn and turned until ears 32, engage with upper face 34, to secure independent rotation to members 4 and 12. Spring 31 bears against interior wall 35 and stop-pins 36 in the locking pins.

In using the device, the dust-cap, axle-nut, and cones having been removed, the handles are attached to the oscillating member with the off-set ends extending oppositely to the hub engaging sleeve, and the locking-pins are set to rotate the parts in unison, for securing the device to the hub in place of the dust cap. The locking-pins are then disengaged from the sleeve, thus allowing member 4 to rotate upon and independently of sleeve 12, the oscillation of member 4 causing the sliding bolt member to advance against the end of the axle, thus drawing the wheel therefrom in a uniform manner and a straight direction, the essence of our invention comprising a tool for withdrawing the wheel from the axle and having detachable handles for packing in a small space.

We claim as our invention:

1. In a wheel puller for motor vehicles, a sleeve adapted to engage with a wheel-hub, an oscillating member arranged concentrically upon the sleeve, having a transverse opening, a ratchet-nut arranged in said opening, reversible pawls pivotally mounted in said opening and engaging with the nut, a flange on the sleeve engaging with the oscillating member, locking-pins connecting the oscillating member and sleeve, ears upon the locking pins to hold the same in an inoperative position, a bolt actuated by the ratchet-nut, slidably and concentrically mounted in said sleeve and oscillating member, and detachable handles for operating the oscillating member independently of the sleeve and thereby impart an advancing motion to the slidable bolt, substantially as set forth.

2. In a wheel puller for motor vehicles, means for securing the device to a wheel-hub, a slidable bolt adapted to press against the axle, means for actuating the bolt in an advancing direction independently of the securing means, and detachable handles for actuating the bolt actuating means, comprising an off-set portion, a straight portion, a shank on the straight portion adapted to engage with a corresponding socket in the bolt actuating means, a retaining spring catch in the handle, a notched end on said springs engaging with a corresponding recess in said socket, and buttons secured to the springs, to hold the same in an operable position and adapted to be depressed to release the spring catch, substantially as set forth.

3. In a wheel puller for motor vehicles, an oscillating member having a transverse opening therein, and sockets on opposite ends, detachable handles with straight and off-set portions, means for attaching the handles in reversed positions, a ratchet-nut arranged in said transverse opening, reversible pawls mounted in said opening and engaging with the ratchet-nut, a groove in each pawl, a spring normally holding the pawls in engagement with the ratchet-nut, the ends of the spring being adapted to be shifted in the grooves of the pawls for reversing the action thereof, a bolt slidably mounted in the oscillating member and arranged to be actuated by the ratchet-nut, a flanged member adapted to engage with a wheel-hub, arranged concentrically with and rotatably mounted on the oscillating member, the bolt being slidable in the flanged member and means to rotate the flanged sleeve independently of or in unison with the oscillating member, comprising locking-pins slidably arranged therein and adapted to extend into corresponding openings in the flanged sleeve, ears to hold the locking pins in an inoperative position and a spring bearing against the inner wall of the transverse opening and against stop-pins in the locking-pins to hold the same in an operative position, whereby the sliding bolt may be actuated in an advancing or receding direction, substantially as set forth.

4. In a wheel puller for motor vehicles, an oscillating member having a retaining chamber formed therein to contain moving parts, a ratchet-nut mounted in the retaining chamber having double-edged teeth peripherally arranged thereon, double-nosed pawls mounted in the retaining chamber, adapted to engage with the ratchet-nut in either position, means to reverse the pawls, a flat-sided bolt mounted in the oscillating member and actuated by the ratchet-nut, and a hub-engaging sleeve rotatably mounted on the oscillating member, said sleeve having an opening with flat sides corresponding to the sides of the bolt, concentrically arranged therein, whereby said bolt may slide through said sleeve, when the oscillating member is manually operated, substantially as set forth.

In testimony whereof we have hereunto affixed our signatures this 12th day of April, 1911, in the presence of two witnesses.

JAMES B. ALLEN.
WILLIAM BOWLER.

Witnesses:
J. W. MASTER,
F. M. KEENEY.

---

Copies of this patent may be obtained for five cents each, by addressing the "Commissioner of Patents, Washington, D. C."